UNITED STATES PATENT OFFICE.

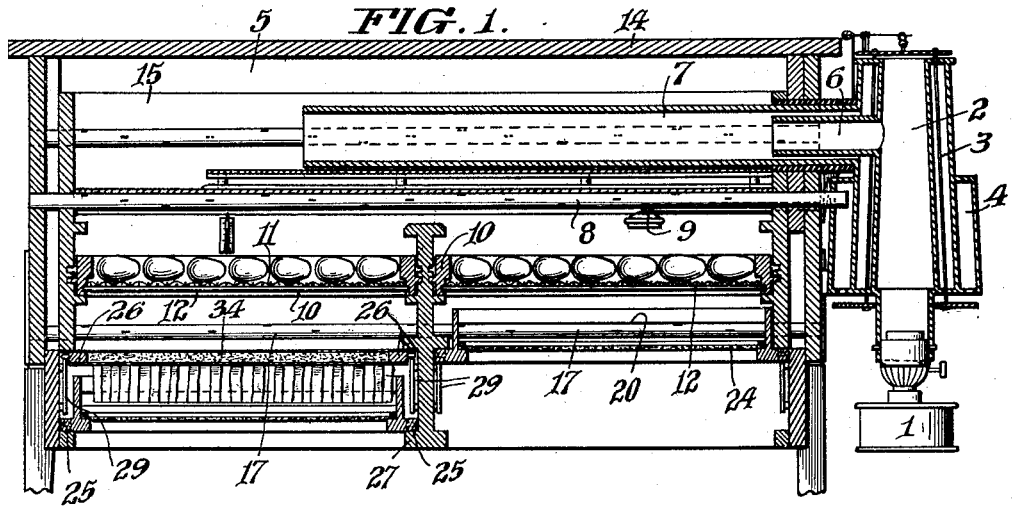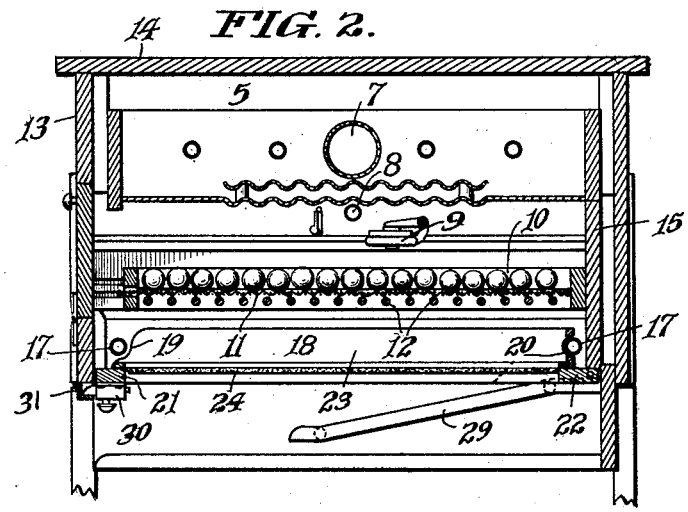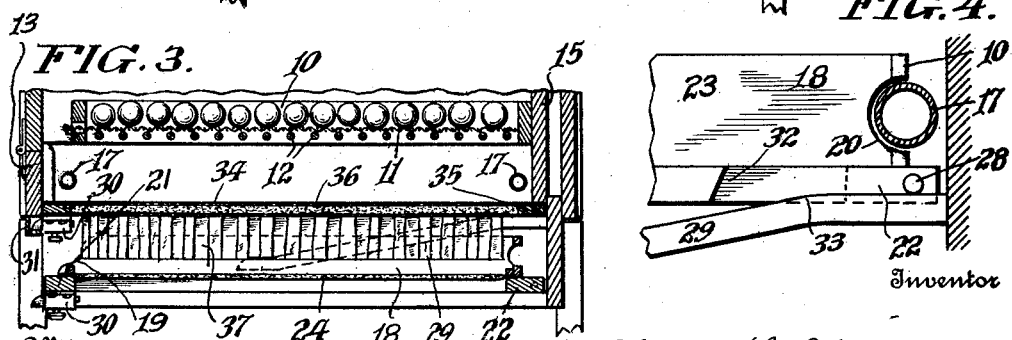

CHARLES L. VETTER, OF PHILADELPHIA, PENNSYLVANIA.

SLIDING BOTTOM FOR INCUBATORS.

1,109,269. Specification of Letters Patent. Patented Sept. 1, 1914.

Application filed December 12, 1910. Serial No. 596,747.

*To all whom it may concern:*

Be it known that I, CHARLES L. VETTER, a citizen of the United States, and a resident of Philadelphia, Pennsylvania, have invented a certain new and useful Sliding Bottom for Incubators, of which the following is a specification.

The purpose of my invention is to provide a new bottom which shall receive the chicks as they are hatched, which can be removed preferably by dropping to a position in which it is removable, as is a drawer, and to permit its use in the dropped position as a brooder. I prefer also to supply another bottom in the place which the first formerly occupied, in order to close the incubator so that a new setting of eggs can be started. This second bottom may be made the top of the brooder, and may carry the "mother" for use within the brooder.

A further purpose of my invention is to provide simple means for the guidance and support of the several bottoms, so that the latter may be quickly and easily placed and withdrawn, and to secure interchangeability of bottoms for the purpose of providing a nursery and brooder in the same incubator without the necessity of changing the chicks from one bottom to another.

A further purpose of my invention is to provide an interchangeable nursery and brooder bottom, means for supporting it in either position, and a nursery bottom and brooder top capable of insertion when the interchangeable bottom is in the brooder position.

I have preferred to illustrate my invention by the form thereof shown, as this has proved successful in actual practice and well illustrates the general principles involved, though I recognize that some of the advantages of my invention can be obtained by other and widely different constructions.

Figure 1 is a vertical longitudinal section of the preferred form of my invention. Fig. 2 is a transverse section of the form shown in Fig. 1. Fig. 3 is a broken transverse section similar to Fig. 2, but with the parts in different positions. Fig. 4 is an enlarged fragmentary section of a portion of the structure of Fig. 2.

In the drawings similar numerals refer to corresponding parts.

The lamp 1, heating three concentric casings 2, 3 and 4, and supplying heat therefrom to the upper closed incubator compartment 5 by pipes 6 and 7, and to the egg compartment by means of pipe 8, all controlled by thermostat 9, as also the thermometer with its support, and the egg trays 10 are all shown and described in a copending application filed by me.

My invention is most desirably used with egg trays whose bottoms are removable to permit the chicks ultimately to fall through into a nursery, but this is not essential. One such form is here illustrated, having bottom 11 removable to drop the eggs upon the bars 12 at pipping time, between which bars the chicks drop when the eggs are hatched. My invention is advantageous also with other nursery arrangements, and other bottoms and constructions not entering into the claims.

I use any suitable form of incubator box or casing, which I have shown as having an outer shell 13, a top 14, and a lining 15, and provide a door opening or openings as at 16.

In the form shown I have preferred to pass the ventilating pipes 17 entirely through the incubator, and cut away the removable bottom 18 at 19 and 20 to accommodate them.

The bottom 18 is shown as comprising a frame having front and back members 21, 22, connected by said members 23 and carrying floor 24, all of any suitable material. The outer parts of the sides are shown as carrying strips 25 which perform a guiding and sealing function. These strips rest against meeting frame strips 26 at the top, when my removable bottom is in its raised or nursery position, thus sealing the edges, and when the bottom is lowered, rest upon and seal against strips 27. The strips 25 also act as or in conjunction with guides between these positions. I illustrate this by projections 28 upon the strips 25 which ride upon the guides 29 to support the rear of the bottom in the upper position and to guide the rear of the bottom in its movement forwardly and downwardly when it is being changed to the lower position, and vice versa. The guide 29 does not reach the bottom strip 27, leaving space within which the pin 28 passes freely when the bottom is shoved directly back while resting on the strip 27.

The front of the removable bottom is supported preferably by a catch 30, which will latch within pocket 31, when pressed upwardly.

This removable bottom becomes a combination bottom when it is intended for brooder uses. Since the front is then open, a cover is desirable, which cover forms a temporary bottom to the nursery. In view of this fact, and because the combination feature of the bottom need not be used and both of these bottoms are removable, I prefer to distinguish this combination bottom by the term "main" bottom.

The front of the main bottom is supported in its upper position by the latch, while the rear is at the same time supported preferably by the pin 28, though permissibly in part or altogether by the pipe 17.

A portion of the strips 25 is cut away at 32 to give room for the angle 33 of the relatively narrow guide, with care that the cutting away of the strips shall not be sufficient to interfere with the performance of the strips sealing function at top and bottom in its several positions.

In operation, the main bottom can receive the chicks as a nursery, when in the upper position and be released at the front latch and very slightly dipped there to free it from the front of the incubator frame so that it can be pulled forward and then forwardly and downwardly in a maintained horizontal position. During this movement, the front is supported by the hand of the operator, while the rear portion is supported by the pins 28 which follow the outline of tracks 29. I have preferred to show these of substantially uniform slope, but, evidently, the slope may follow any other desired law. The main bottom rests with the strips 25 upon the ledges or strips 27, when the pins have left the guides 29. The bottom may then be removed from the incubator altogether, as would be the case with a drawer, by forward horizontal movement or it may be shoved horizontally backward into the brooder position, the pins 28 then passing beneath the lower ends of the guides or tracks 29.

In resetting the bottom, it is pushed in or pulled out, as the case may be, depending upon its previous position, until the pins 28 are below and just in front of the lower front ends of the tracks 29, when the bottom is lifted or is tilted upon the front ends of the strips 27, to bring the pins above the lower ends of the guides. The bottom is then pushed back, following the guides into a position where a final slight upward movement of the front end latches it.

When the removable bottom has been lowered for brooder purposes or removed as for cleaning, any suitable auxiliary bottom, such as 34, may be inserted. I prefer not to make this auxiliary bottom a duplicate of the main bottom, though, with spacing to give the necessary height for the insertion of the auxiliary bottom while the main bottom is in place, or by removal of the main bottom from the incubator until after the auxiliary has been placed, a duplicate could be used.

I prefer to make the auxiliary bottom without sides wherever the brooder use of the auxiliary bottom will cease before a second set of eggs is hatched. I illustrate this auxiliary as comprising a frame 35 with any suitable floor 36 and any latch desired. I also prefer to make use of the auxiliary bottom as a carrier for the "mother" of the brooder at the same time that, as the floor of the nursery, it becomes the cover of the brooder. For that purpose I secure any suitable strips 37 to the under side of the floor 36.

Since the main bottom does not require a front wall for the nursery use and the absence of this wall is desirable for its use as a brooder, I have shown it as open in the front, a matter of accommodation to the tastes or needs of the individual or location.

What I claim as new and desire to secure by Letters Patent is:—

1. In an incubator, a casing, a main bottom, upper and lower supports for the said bottom, and an auxiliary bottom fitting the upper supports and provided with a brooder mother upon its under surface.

2. In an incubator, a casing, a movable bottom, upper and lower supports therefor retaining the bottom in either of two positions, the one directly over the other, and a guide directing the path of the bottom in movement between the supports.

3. In an incubator, a casing, a removable brooder bottom therefor, and a removable brooder top carrying a brooder mother and providing a bottom for the incubator upon its upper surface.

4. In an incubator, a casing, a bottom capable of movement within the casing and wholly removable therefrom, supports at the back of the bottom, a track guiding the supports in movement within the casing and means for guiding the bottom in insertion or removal when the supports pass beneath the track.

5. In an incubator, a casing, a removable bottom therefor, coöperating strips upon the casing and bottom engaging along horizontal planes to seal the strips upon the bottom against strips on the casing to prevent leakage of air in upper and lower operative positions within the casing, and a track upon which the bottom is guided between the positions.

6. In an incubator, a casing, a bottom, guides upon which the bottom is free to slide into and away from a lower set position, means for supporting the bottom in an upper set position and an inclined guide engaging the bottom and guiding one end thereof into the upper set position.

CHARLES L. VETTER.

Witnesses:
WILLIAM STEELL JACKSON,
HELEN I. KAUFFMAN.